United States Patent
Balakrishnan et al.

(10) Patent No.: US 11,593,521 B1
(45) Date of Patent: *Feb. 28, 2023

(54) TAG-BASED APPLICATION OF MASKING POLICY

(71) Applicant: Snowflake Inc., Bozeman, MT (US)

(72) Inventors: Raja Suresh Krishna Balakrishnan, Fremont, CA (US); Khalid Zaman Bijon, Santa Cruz, CA (US); Subramanian Muralidhar, Mercer Island, WA (US); David Schultz, Piedmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,032

(22) Filed: Feb. 4, 2022

(51) Int. Cl.
*G06F 21/62* (2013.01)
*G06F 16/245* (2019.01)
*G06F 16/28* (2019.01)

(52) U.S. Cl.
CPC ........ *G06F 21/6254* (2013.01); *G06F 16/245* (2019.01); *G06F 16/284* (2019.01)

(58) Field of Classification Search
CPC ... G06F 21/6254; G06F 16/245; G06F 16/284
USPC .......................................................... 726/26
See application file for complete search history.

(56) References Cited

U.S. PATENT DOCUMENTS

| | | | | |
|---|---|---|---|---|
| 9,609,025 B1* | 3/2017 | Betzler | ............... | H04L 63/0245 |
| 10,541,982 B1* | 1/2020 | Lee | ...................... | G06F 40/211 |
| 10,867,063 B1 | 12/2020 | Avanes et al. | | |
| 10,936,751 B1* | 3/2021 | Scotney | ................ | G06F 40/284 |
| 10,963,590 B1* | 3/2021 | Dash | ..................... | G06F 21/604 |
| 11,086,890 B1* | 8/2021 | Li | ......................... | G06F 16/335 |
| 11,263,335 B2* | 3/2022 | Parthasarathy | ... | G06F 16/24578 |
| 11,269,871 B1* | 3/2022 | Bigdelu | ................ | G06F 16/252 |
| 11,301,478 B1* | 4/2022 | Avanes | .................. | G06F 16/211 |
| 2014/0040134 A1* | 2/2014 | Ciurea | ................. | G06Q 20/383 705/44 |
| 2015/0150139 A1* | 5/2015 | Pauquet | .................. | G06F 16/31 707/755 |
| 2016/0070917 A1* | 3/2016 | Rozenberg | .......... | G06F 21/6254 726/26 |
| 2016/0147945 A1* | 5/2016 | MacCarthy | ........... | H04W 12/02 705/51 |
| 2017/0091279 A1* | 3/2017 | Shah | .................... | G06F 16/2455 |
| 2018/0004978 A1* | 1/2018 | Hebert | ................ | G06F 16/2457 |
| 2020/0311304 A1* | 10/2020 | Parthasarathy | ..... | G06F 21/6218 |

(Continued)

FOREIGN PATENT DOCUMENTS

CN 112818398 A * 5/2021

OTHER PUBLICATIONS

Alfredo Cuzzocrea; Data masking techniques; IEEE:2017; pp. 4467-4473.*

*Primary Examiner* — Monjur Rahim
(74) *Attorney, Agent, or Firm* — Schwegman Lundberg & Woessner, P.A.

(57) ABSTRACT

Various embodiments provide for tag-based application of a masking policy, which can be used in connection with a data platform. In particular, various embodiments enable enforcement of one or more masking policies against an entity (e.g., object) of a data platform, such as a database, a table, a row, or a column, based on one or more tags associated with the entity.

30 Claims, 7 Drawing Sheets

(56) References Cited

U.S. PATENT DOCUMENTS

2021/0097199 A1\* 4/2021 Liao ...................... G06F 21/604
2022/0215107 A1\* 7/2022 Wong ................ G06F 16/24565

\* cited by examiner

TAG-BASED APPLICATION OF MASKING POLICY

TECHNICAL FIELD

Embodiments of the disclosure relate generally to databases and, more specifically, to applying a masking policy based on a tag, which can be used in connection with a data platform.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. To protect certain types of data, such as personally identifiable information (PII) (e.g., email, phone number, name, gender, birth date, home address, Internet Protocol (IP) address, social security number, or the like) or finance data, a system can apply a policy (e.g., at database, a table, a column, or row level) to mask data as it is accessed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
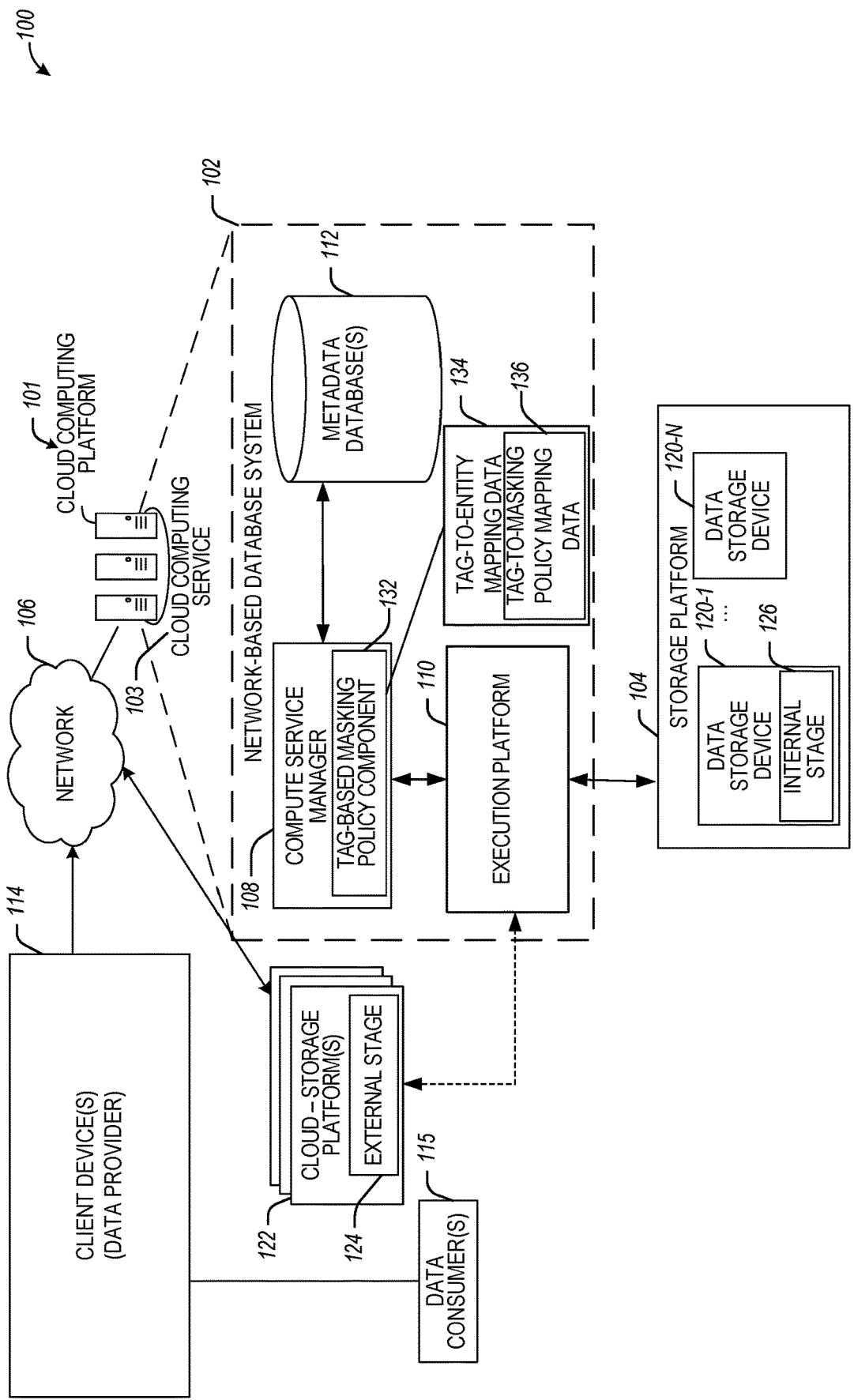
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems. Databases may include one or more tables that include or reference data that can be read, modified, or deleted using queries. Querying very large databases and/or tables might require scanning large amounts of data.

In a typical implementation, a data platform includes one or more databases that are maintained on behalf of a customer account. The data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth.

Conventional data platforms, such as database systems, permit for masking of stored information or data stored on the data platform. For instance, a policy (e.g., masking policy) can be defined to mask certain types (e.g., text, number, timestamp, blob, PII, payment information, account number, or financial data) of data stored in a database, and the policy can be assigned to (e.g., mapped to, associated with, or applied to) select columns or rows of a database table. Unfortunately, the process of applying the policy often is a manual one, where a user (e.g., administrator) manually selects and assigns a masking policy to each individual column they wish to mask.

Aspects of the present disclosure provide techniques for tag-based application of a masking policy. In particular, various embodiments enable enforcement of one or more masking policies against an entity (e.g., object) of a data platform, such as a database, a table, a row, or a column, based on one or more tags associated with the entity. Various embodiments described herein can be used to reduce manual effort in assigning (e.g., mapping, associating, applying) a masking policy to individual entities (e.g., databases, tables, columns, or rows).

According to some embodiments, a framework is provided for tag-based application of a masking policy, where an assignment (e.g., mapping, association, or application) of a tag to a particular entity (e.g., particular column) can implicitly enforce one or more masking policies that are directly assigned to the tag. With tag-based application (e.g., enforcement) of a masking policy, the masking policy can be assigned to one or more tags, and any entity (e.g., column) associated (e.g., assigned) with those one or more tags can automatically inherit the masking policy. By assigning a masking policy to a tag, a user (e.g., data steward) can map the masking policy on one or more columns associated with the tag while obviating the need for the user explicitly mapping the masking policy to those one or more columns. In this way, tag-based application of a masking policy can implement conditional masking policy mapping on one or more entities (e.g., one or more column objects). For some embodiments, a tag-based application of a policy mask is performed at runtime, such as when a query is being executed on an object (e.g., column object) that is assigned a tag and the tag is assigned to the policy mask. Additionally, for some embodiments, a masking policy can be assigned to an individual tag and, based on lineage of the individual tag, the masking policy can be automatically applied to one or more (e.g., all) entities descending from an entity that is assigned to the individual tag. For example, by some embodiments, a tag can be assigned to a database, a masking policy can be assigned to the tag, and based on the assignment of the masking policy to the tag, the masking policy can be implicitly assigned to the database (e.g., all columns of all tables of the database), thereby permitting database-level enforcement of the masking policy.

Some embodiments provide a feature for auditing a database for tag-based masking policy. Additionally, prior to committing or actually executing an assignment of a masking policy to a tag, some embodiments provide a feature for testing or generating an outcome of the assignment (e.g., so that a user can preview one or more effects of the assignment prior to commitment or execution of the assignment).

In accordance with some embodiments, a user (e.g., data steward or administrator) can cause a masking policy (e.g., a PII masking policy to mask PII data) to be generated (e.g., created), which can be added or stored to a database schema. A user can generate (e.g., create) a tag (e.g., PII tag), which can be added or stored to a database schema (e.g., same schema as the masking policy) and which can be assigned (e.g., mapped) to a column (e.g., a column that stores PII data). A user can cause the generated tag to be assigned to one or more columns (e.g., employee_ssn of a table employee_info and contractor_ssn columns of a table contractor_info) to indicate that the columns contain certain type of data associated with the tag (e.g., PII data). The ability of a user to cause generation of a masking policy, generation of a tag, or assignment of a tag to an entity (e.g., column) can be permission-based (e.g., based on the user's privileges). Subsequently, a user can cause a masking policy to be assigned (e.g., mapped, associated, or applied) to a tag, which can eventually result in an embodiment applying the masking policy to one or more individual entities (e.g., columns of tables) that are assigned to the tag.

For some embodiments, assignment of an individual masking policy to one or more tags (or the assignment of an individual tag to one or more masking policies) comprises a storing data regarding the assignment (e.g., a record of the assignment or mapping) in policy-to-tag mapping data (e.g., policy-to-tag mapping table). Alternatively, or additionally, for some embodiments, assignment of an individual masking policy to one or more tags comprises specifying a set of tags (e.g., set of values corresponding to different tags) in a definition of the individual masking policy.

During runtime, when a query (e.g., query plan) is being executed on a specified entity (e.g., column of a table), some embodiments determine (e.g., identify) a set of tags assigned to (e.g., associated with) the specified entity, determine (e.g., identify) a set of masking policies assigned to (e.g., associated with) at least one tag in the set of tags, and apply the set of masking policies on the specified entity. For some embodiments, applying a masking policy (e.g., from the set of masking policies) to the specified entity comprises determining whether a data type associated with (e.g., defined by) the masking policy matches a data type associated with the specified entity, and applying a mask to at least a portion of data stored by (e.g., in) the specified entity (e.g., enforce the masking policy on the specified entity) in response to the data types matching. In this way, the set of masking policies can comprise multiple masking policies for different data types that can mask data of the specified entity (e.g., data accessed from the specified entity) according to the data's type. The masking policy may not be applied where the data types do not match.

To provide support for tag-based application of masking policies, some embodiments implement a function to determine (e.g., identify or discover) one or more tags (e.g., different tag values corresponding to different tags) of an entity (e.g., a column) or a parent entity thereof (e.g., tag values of a (parent) table of the column). Such a function can enable identification of a column tag value in an expression of a masking policy. Some embodiments implement a function to determine (e.g., identify or discover) one or more masking policies that are assigned to (e.g., associated with or mapped to) an entity (e.g., column). Such a function can provide for (e.g., generate) a tag-based policy discovery table. Alternatively, some embodiments implement a function to determine (e.g., identify or discover) one or more columns that are assigned to (e.g., associated with or mapped to) a masking policy by way of a tag. Such a function can also provide for (e.g., generate) a tag-based policy discovery table.

With respect to replication, where a single database has one or more assignments between tags and masking policies, replication of the single database can comprise replication of those assignments where a tag and associated masking policy are part of the single database. If an assignment involves a tag or a masking policy that is not part of the single database, either that assignment is not replicated or the replication of the single database can fail. Additionally, where a single database has one or more assignments between system tags (e.g., a tag that is not part of the single database but, rather, shared across multiple databases of a system) and masking policies, replication of the single database can comprise replication of those assignments where the associated masking policy is part of the single database. If an assignment involves a masking policy that is not part of the single database, either that assignment is not replicated or the replication of the single database can fail. Similar behavior can be implemented for group-based replications.

As used herein, an entity on a data platform can be a schema-level entity. Examples of an entity can include, without limitations, a database, a table, a column, a row, a tag, or a masking policy. For some embodiments, a table can comprise one or more columns, and a column can store a value as a key=value pair to represent a certain property of the table. An entity can be implemented or represented by an object on a data platform. For example, a masking policy can be implemented or represented by a masking policy object, and a tag can be implemented or represented by a tag object. When data (e.g., a value) is accessed from an object (e.g., column object) that is being masked (e.g., based on a masking policy), the accessed data is at least partially (e.g., completely) masked using one or more characters, such as one or more asterisks (e.g., string of asterisks), to hide the actual data (e.g., the actual value) provided by the object.

As used herein, a tag can be assigned (e.g., mapped, associated, or applied) to an entity (or database system entity), such as a table, a column, a row, or a database itself, to categorize, facilitate detection, or apply different security property to different types of data, such as sensitive data (e.g., PII). For example, a user (e.g., data steward) can generate a tag called 'PIT' and assign that 'PIT' tag to one or more columns (e.g., column objects) that store PII data, such as a column (e.g., column object) that stores social security numbers. A tag assignment (e.g., mapping) can be one tag to many entities. Additionally, a tag can be data type agnostic.

As used herein, assignment (e.g., mapping, associating, or application) of a masking policy to a tag can comprise assigning the masking policy (e.g., a corresponding masking policy object) to the tag (e.g., a corresponding tag object). Depending on the embodiment, two or more masking policies can be assigned to an individual tag. A masking policy (or data masking policy) can define one or more parameters for applying a mask to data stored by an object (e.g., column object). For example, a masking policy called 'SSN_MASK' can be generated and directly assigned to a column (e.g., column object) storing social security numbers to mask some or all of the data access from the column. A masking policy can define a policy function to mask data from an entity (e.g., a column of a table) when the masking policy is assigned to the entity, where the policy function can consider one or more conditions (e.g., attributes) for determining whether masking is applied to the data from the entity (e.g., mask the data for certain tags or for all users except an admin user) or how the masking is applied to the data from the entity (e.g., mask only a first portion of the data). For some embodiments, an individual masking policy can be data-type specific (e.g., text or number data type). For instance, two or more masking policies (e.g., masking policy objects) for different data types can be applied to an individual tag (e.g., tag object), the individual tag can be associated with an individual column (e.g., column object), and an embodiment can appropriately apply, from the two or more masking policies, to those one or more masking policies that match the individual column's data type.

As used herein, an execution node can comprise a worker, a thread, a computing device or entity (e.g., server), a processor, or the like. Two or more execution nodes can communicate with each other.

In the present disclosure, "files" refer to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location."

Computer-readable files come in several varieties, including unstructured files, semi-structured files, and structured files. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

The various embodiments that are described herein are described with reference where appropriate to one or more of the various figures.

FIG. 1 illustrates an example computing environment 100 that includes a database system in the example form of a network-based database system 102, in accordance with some embodiments of the present disclosure. For some embodiments, the network-based database system 102 implements part of a data platform configured for tag-based application of masking policies as described herein. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., tag-based application of masking policies as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, a users account object of the user's account object type lists users authorized to access at least one target account (e.g., an account of a data provider or data consumer 115). In some embodiments, a roles account object of the roles account object type configures privileges for the users to access the at least one target account. In some aspects, a warehouse object of the warehouse object type indicates compute resources (e.g., at least one virtual warehouse of the execution platform 110) for executing a workload associated with one or more databases of the data provider. In some embodiments, a resource monitor object of the resource monitor object type configures monitoring usage of the compute resources.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
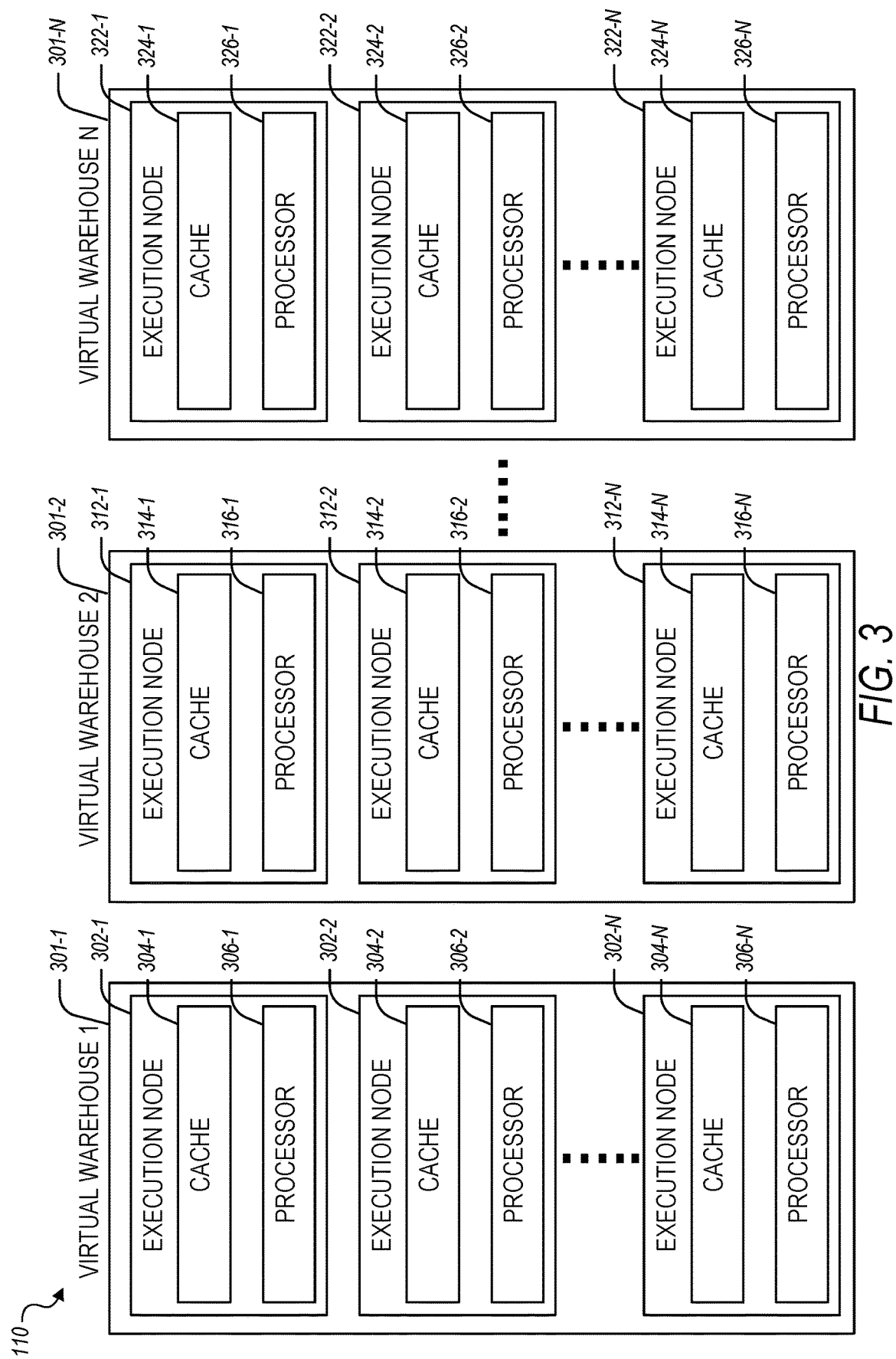
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a tag-based masking policy component 132 that comprises suitable circuitry, interfaces, logic, and/or code and is configured to perform the disclosed functionalities associated with (e.g., enabling) tag-based application of a masking policy by the network-based database system 102. For instance, the tag-based masking policy component 132 of some embodiments can implement (or otherwise support) tag-based masking policy management, which can include functionalities that enable a user to add or remove an assignment between a masking policy and a new or existing tag. For example, the tag-based masking policy component 132 can provide support for a language, such as a data description language (DDL), for such assignment operations, support for authorization logic for such assignment operations, and support for execution processes. Assignment between one or more masking policies (e.g., masking policy entities or objects) and one or more tags (e.g., tag entities or objects) can be stored as tag-to-masking policy mapping data 136, which may or may not form part of tag-to-entity mapping data 134 that generally stores assignments between tags and entities. The tag-to-entity mapping data 134 can describe, for example, an assignment between a tag and a column (e.g., column entity or object) or a tag and a table (e.g., table entity or object), where the column can be part of the table. One or more assignments can be stored as one or more records in a database table. Additionally, depending on the embodiment, the tag-to-entity mapping data 134, the tag-to-masking policy mapping data 136, or both can represent metadata, and can be stored on a metadata database 112.

The tag-based masking policy component 132 of some embodiments can implement (or otherwise support) tag-based masking policy enforcement, which can include functionalities for tag-based application (e.g., conditional application) of a masking policy to a specified entity based on the specified entity's association with one or more tags. The tag-based masking policy component 132 of some embodiments can implement (or otherwise support) tag-based masking policy assignment discovery, which can include functionalities for determining (e.g., discovering, identifying, or surfacing) masking policy mapping information for a specified entity (e.g., table or column object) based on the specified entity's association with one or more tags. For instance, the determination of masking policy mapping information for entities based on entity associations with tags can be provided by the tag-to-entity mapping data 134, the tag-to-masking policy mapping data 136, or both. Though not illustrated, in some embodiments, the execution platform 110 can be configured with at least some portion of the tag-based masking policy component 132 to facilitate tag-based application of a masking policy. More regarding tag-based application of a masking policy are discussed in connection with FIG. 4-FIG. 6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
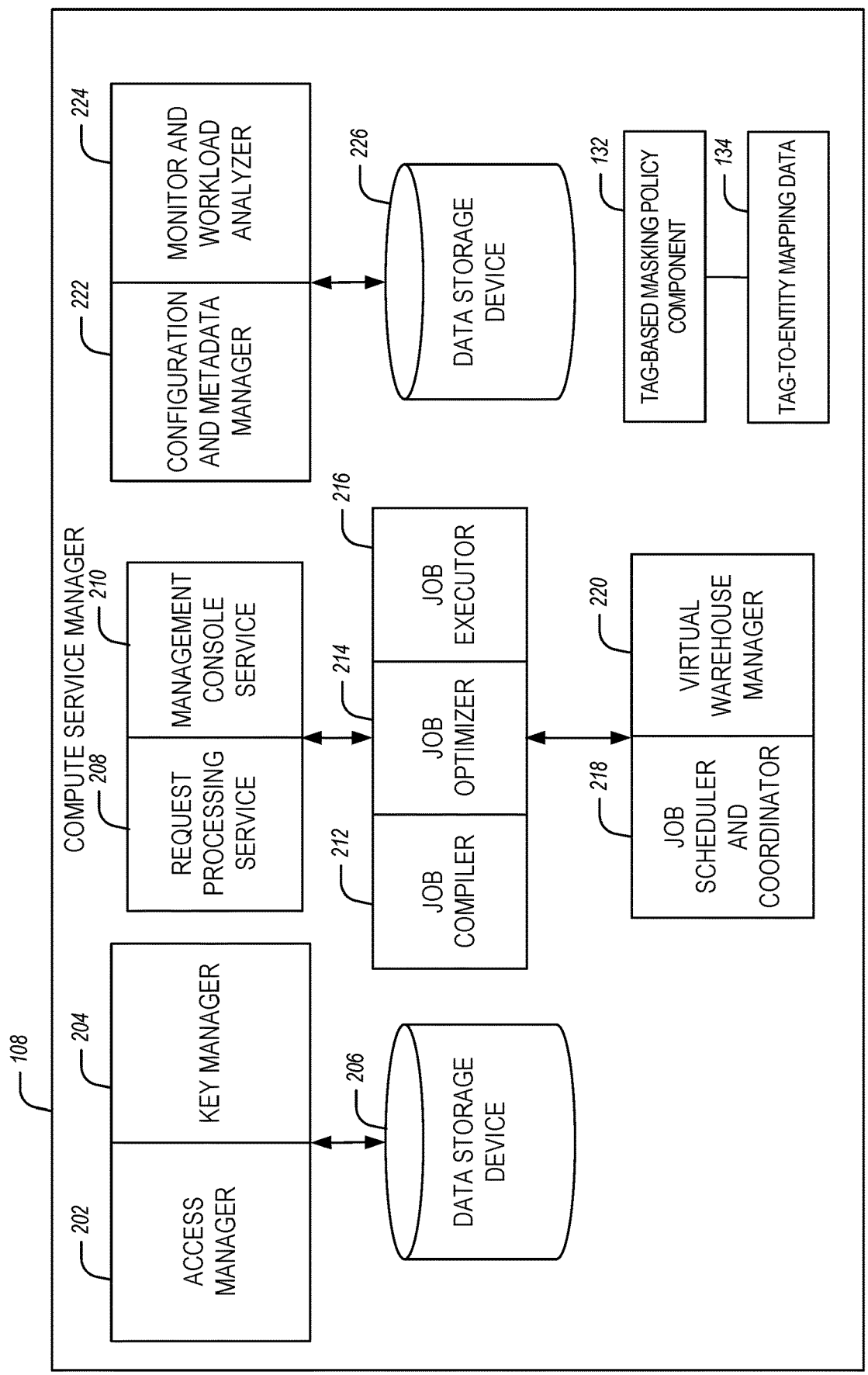
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to a data storage device 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the tag-based masking policy component 132 configured to perform the disclosed functionalities associated with tag-based application of a masking policy, which can use tag-to-entity mapping data 134 to operate.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

According to various embodiments, the tag-based masking policy component 132 implements (or otherwise supports) tag-based application of a masking policy on a specified entity (e.g., database, table, row, or column entity or object) based on the specified entity's association to one or more tags. In some embodiments, the execution platform 110 can be configured with at least some portion of the tag-based masking policy component 132 to facilitate tag-based application of a masking policy.

Figure 4:
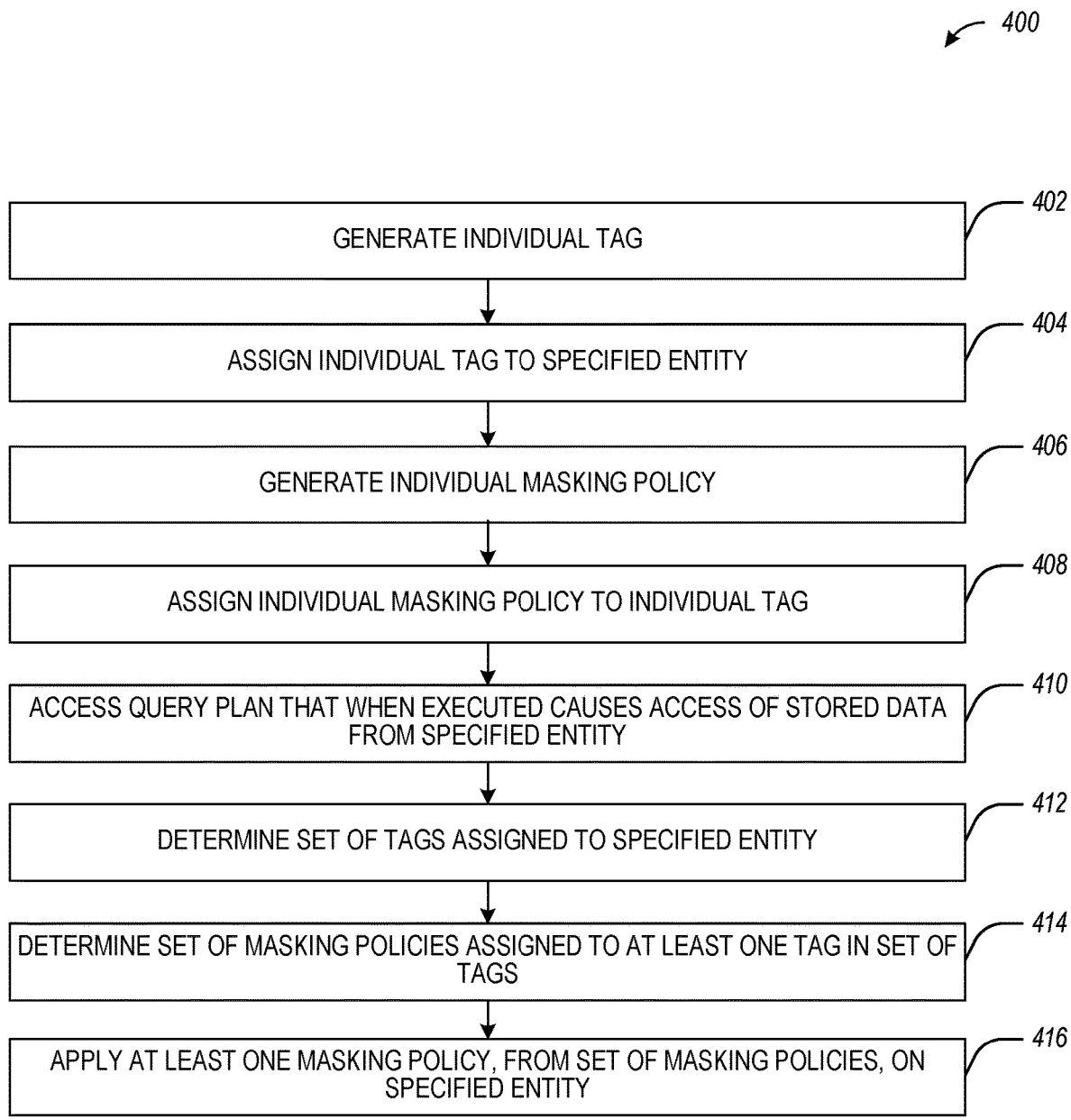
FIG. 4 is a flow diagram illustrating operations of a data platform in performing an example method for tag-based application of a masking policy, in accordance with some embodiments of the present disclosure.

FIG. 4 is a flow diagram illustrating operations of a data platform in performing an example method 400 for tag-based application of a masking policy, in accordance with some embodiments of the present disclosure. Method 400 may be embodied in computer-readable instructions for execution by one or more hardware components (e.g., one or more processors) such that the operations of the method 400 may be performed by components of the network-based database system 102, such as tag-based masking policy component 132 or computing device which may be implemented as machine 700 of FIG. 7 and may be configured with an application connector performing the disclosed functions. Accordingly, method 400 is described below, by way of example with reference thereto. However, it shall be appreciated that method 400 may be deployed on various other hardware configurations and is not intended to be limited to deployment within the network-based database system 102.

At operation 402, a processing device (e.g., comprising a hardware processor) generates an individual tag, which can be generated in association with a single database or generated at a system level (e.g., shareable across multiple databases of a data platform). Operation 402 can be performed based on or in response to a user request, a user instruction, or a user selection. For instance, a user can enter the following instruction (e.g., SQL instruction) to generate a new tag 'PII' intended for assignment to entities (e.g., tables, columns, etc.) that store PII data: "CREATE TAG PII." According to some embodiments, tags are data type agnostic, where a given tag can be assigned to entities of different data types.

During operation 404, the processing device assigns an individual tag (e.g., an existing tag, such as a system tag, or the new tag generated by operation 402) to a specified entity (e.g., specified object) of a database system, such as a database, a table, a row, or a column. Operation 404 can be performed based on or in response to a user request, a user instruction, or a user selection. For example, a user can enter the following instruction (e.g., SQL instruction) to assign a tag 'PII' to a column 'EMPLOYEE_SSN' of a table 'EMPLOYEE_INFO' used to store a social security number of an employee: "ALTER TABLE EMPLOYEE_SSN MODIFY COLUMN EMPLOYEE_SSN TAG PII." Additionally, when assigning a tag to an entity, an embodiment can enable a user to assign a value to the tag during the assignment. For instance, a user can enter the following instruction to assign a tag 'PII' to a column 'EMPLOYEE_SSN' of a table 'EMPLOYEE_INFO' with a tag value 'SSN' that indicates the tag is associated with a social security number: "ALTER TABLE EMPLOYEE_SSN MODIFY COLUMN EMPLOYEE_SSN TAG PII='SSN'."

Some embodiments implement tag lineage, where assigning a given tag to a given entity (e.g., table entity object) results in one or more entities (e.g., one or more column entities or objects) that descend from the given entity inheriting the assignment of the given tag. For example, a user can enter the following instruction (e.g., SQL instruction) to assign a tag 'PII' to a table 'EMPLOYEE_INFO': "ALTER TABLE EMPLOYEE_SSN MODIFY EE_SSN TAG PII." In doing so, the column 'EMPLOYEE_SSN' of the table 'EMPLOYEE_INFO' can inherit assignment of the tag PII.

The processing device, at operation 406, generates an individual masking policy. For some embodiments, the individual masking policy specifies an association with one or more specified data types, such as a string, number, date, or the like, to which the individual masking policy is configured to apply. Operation 406 can be performed based on or in response to a user request, a user instruction, or a user selection. For instance, a user can enter the following expressions (e.g., SQL expression) as a definition (e.g., definition of a masking function) for a masking policy 'SSN_MASK,' which is configured to receive and apply a mask to a string data type (represented by variable n):

```
CREATE OR REPLACE MASKING POLICY SSN_MASK AS (n string)
    RETURNS string ->
    case
        when    current_role( )='ACCOUNTADMIN'    then
    partial_mask(n)
        else null
end.
```

At operation 408, the processing device assigns an individual masking policy (e.g., an existing masking policy or the new masking policy generated by operation 406) to the individual tag that was assigned to the specified entity by operation 404. Operation 408 can be performed based on or in response to a user request, a user instruction, or a user selection. For example, a user can enter the following instruction (e.g., SQL instruction) to assign a masking policy 'SSN_MASK' to a tag 'PII' that is intended for assignment to entities (e.g., tables, columns, etc.) that store PII data: "ALTER TAG PII SET MASKING POLICY SSN_MASK." According to various embodiments, by assigning the individual tag to the specified entity (e.g., column entity or object) and by assigning the individual masking policy to the individual tag (or vice versa), an implicit association between the individual masking policy and the specified entity is created (e.g., the column entity or object is implicitly mapped to the individual masking policy based on the individual tag). This implicit association can enable the individual masking policy to be applied (e.g., enforced) on the specified entity (e.g., column entity or object) during runtime (e.g., during execution of a query or a query plan that references the specified entity). With respect to the example above, the column EMPLOYEE_SSN of table EMPLOYEE_INFO can be implicitly mapped to the masking policy SSN_MASK at runtime based on the assignment (e.g., association) between the column EMPLOYEE_SSN association with the tag PII and the assignment (e.g., association) between the tag PII and the masking policy SSN_MASK. The use of implicit association as described herein can provide a scalable solution for applying a masking policy to entities (e.g., databases, tables, rows, columns, etc.).

With respect to operation 410, the processing device accesses a query plan that, when executed, causes access of stored data from the specified entity. For instance, continuing with the example from above, the query plan can include a query plan generated based on a following query expression (e.g., SQL statement received from a user), which causes access of stored data from the column EMPLOYEE_SSN of the table EMPLOYEE_INFO; "SELECT EMPLOYEE_SSN FROM EMPLOYEE INFO."

Operations 412 through 416 can be performed during runtime, such as execution of the query plan accessed by operation 410. At operation 412, the processing device determines a set of tags assigned to the specified entity. For instance, based on the assignment of the individual tag to the specified entity by operation 404, the set of tags determined by operation 412 includes the individual tag. For instance, continuing with the example from above, the set of tags determined by operation 412 for the column EMPLOYEE_SSN would include the tag PII (e.g., based on the assignment by operation 404). For some embodiments, operation 412 comprises accessing tag-to-entity mapping data that describes a set of assignments between one or more tags and one or more entities (e.g., database, table, row, or column entity or object) of the database system. The tag-to-entity mapping data can describe tag-to-entity assignments based on entity (e.g., object dependencies (e.g., a column entity of a table entity depends from the table entity). In various embodiments, operation 412 comprises determining any tags directly assigned to the specified entity by way of tag lineage. Additionally, for some embodiments, operation 412 comprises determining any tags that are assigned or indirectly assigned to another entity that is a parent of the specified entity (e.g., tag assignment to the specified entity based on the specified entity's lineage from another entity). For example, the specified entity can comprise a column entity or object, and the parent entity can comprise a table entity or object.

For operation 414, the processing device determines a set of masking policies assigned to at least one tag in the set of tags determined by operation 412. In particular, for each tag in the set of tags, operation 414 can determine every masking policy assigned to the tag. For instance, based on the assignment of the individual masking policy to the specified entity by operation 404, the set of tags determined by operation 412 includes the individual tag. For instance, continuing with the example from above, the set of tags determined by operation 412 for the column EMPLOYEE_SSN would include the tag PII (e.g., based on the assignment by operation 404). For some embodiments, operation 414 comprises accessing policy-to-entity mapping data that describes a set of assignments between one or more policies and one or more entities of a database system. The policy-to-entity mapping data can describe direct assignment between a masking policy entity or object and a tag entity or object.

Eventually, at operation 416, the processing device applies at least one masking policy (e.g., all masking policies), from the set of masking policies, on the specified entity. For various embodiments, a mask in accordance with a masking policy is applied (e.g., enforced) on the specified entity, by the masking policy, in response to determining that the masking policy and the specified entity have a same data type (e.g., the specified entity has the same data type as the masking data type of the masking policy), such as string, number, or date. For example, where the masking policy SSN_MASK is associated with (e.g., specifies) a string data type, the masking policy SSN_MASK is assigned to the tag PII, the tag PII is assigned to a column BIRTHDATE having a date data type, the tag PII is assigned to the column EMPLOYEE_SSN having a string data type, the masking policy SSN_MASK can apply (e.g., enforce) a mask for stored data (e.g., string data) from the column EMPLOYEE_SSN, but the masking policy SSN_MASK will not apply (e.g., enforce) the mask for stored data (e.g., date data) from the column BIRTHDATE. Depending on the embodiment, a definition of a masking policy can include expressions (e.g., logic) for checking whether a data type of a target entity (e.g., column entity or object) matches a data type of the masking policy. According to some embodiments, such a check is used where individual masking policies have specified data types (e.g., masking policies are data type bound) while individual tags are data type agnostic (e.g., are not data type bound). Additionally, data type matching combined with the implicit association of masking policies with entities based on tags can facilitate selective application of masking policies according to data types.

Accordingly, operation 416 can comprise determining whether a first data type associated with a masking policy matches a second data type associated with the specified entity and, in response to determining that the first data type matches the second data type, applying a mask to at least a portion of the stored data (e.g., some or all of the stored data accessed) from the specified entity prior to the stored data being accessed for the query plan. For instance, operation 416 can obtain the first data type associated with the masking policy (e.g., the definition of which can specify the first data type the policy is associated with), and determine whether the obtained first data type matches the second data type of the specified entity. Alternatively, the data type check can form part of a logic defined for the masking policy, or can be performed prior to application of the masking policy. When an embodiment detects that multiple masking policies of a same data type are assigned to multiple tags and those multiple tags are assigned to a same column (e.g., policy1 (NUMBER) assigned to tag1, tag1 assigned to column c1, policy2(NUMBER) assigned to tag2, and tag2 assigned to column c1), the embodiment can cause a warning or an error to be generated regarding the conflict this creates (e.g., error of "MULTIPLE_POLICIES_ASSIGNED_TO_COL- UMN"). In response to the warning or error, a user (e.g., admin user) can resolve the conflict (e.g., the user can cause all but one of the multiple policies to apply to the column c1). The warning or error can be presented to a user via a discovery mechanism or tool used by the user. Additionally or alternatively, when an embodiment detects that multiple masking policies of a same data type are assigned to multiple tags and those multiple tags are assigned to a same column, the embodiment can automatically select one of the multiple policies using a conflict resolution mechanism (e.g., selecting the first of the multiple policies identified).

Various masking policies can define their respective masks differently. For instance, a masking policy can define a masking function that can determine whether a mask is to be applied, how the mask is constructed (e.g., characters to be used for masking, and how many), how the mask is to be applied to stored data accessed from an entity (e.g., what portions of stored data the mask will apply to). For example, the masking policy SSN_MASK can define a mask such that when applied (e.g., enforced) to stored social security numbers, the mask replaces all but the last four digits of social security numbers with masking characters (e.g., 'x' or '*' characters).

For some embodiments, a definition of a masking policy defines a masking function that, when executed on the specified entity, is configured to access the stored data from the specified entity, generate masked data by applying the mask to at least the portion of the stored data, and return the masked data. For some such embodiments, applying the mask of the masking policy to at least the portion of the data comprises (e.g., prior to the stored data being accessed for the query plan) providing access to the stored data by returning the masking function in place of a reference to the specified entity.

For some embodiments, operation 416 applies a masking policy on the specified entity by determining whether another masking policy is directly assigned to the specified entity, and in response to determining that the other masking policy is directly assigned to the specified entity, applying the other masking policy on the specified entity instead of the at least one masking policy. In this way, masking policies directly assigned to the specified entity can take precedence over masking policies that are assigned to the specified entity based on tags.

Figure 5:
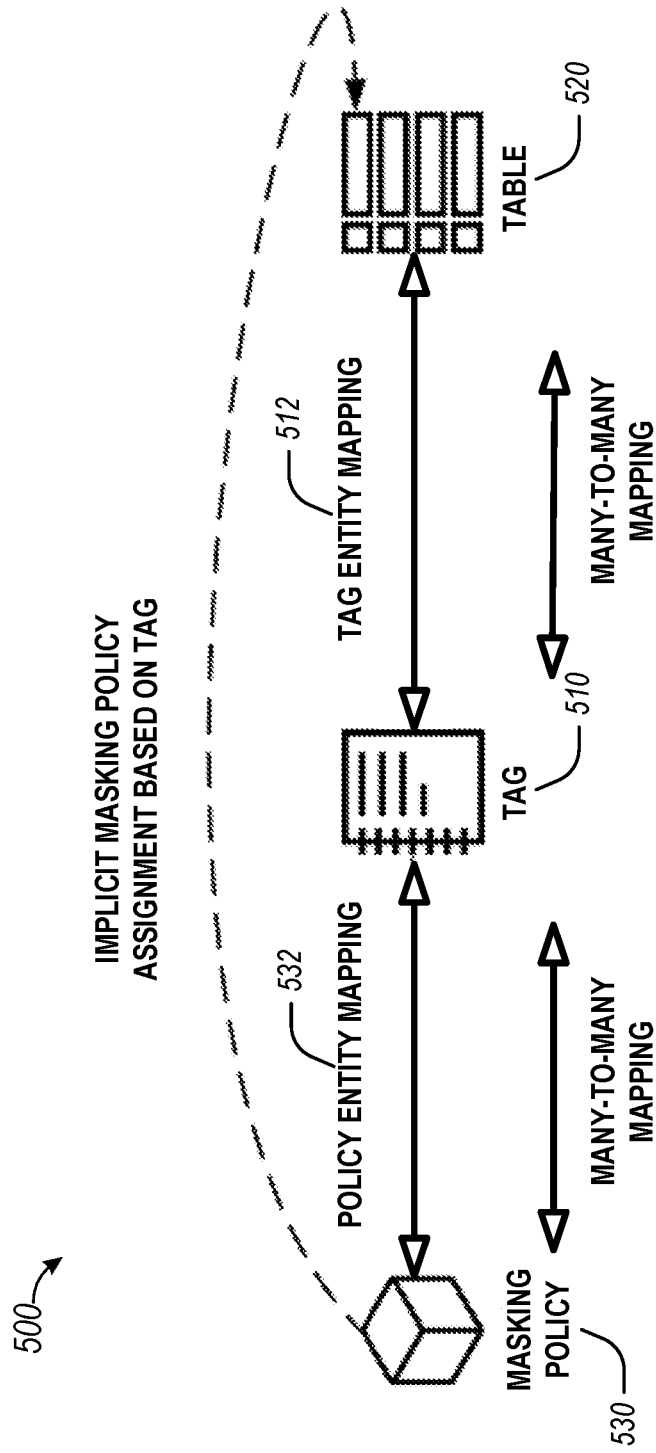
FIG. 5 presents a graphical representation of an example assignment of a masking policy to a table based on a tag assigned to the table, in accordance with some embodiments of the present disclosure.

FIG. 5 presents a graphical representation 500 of an example assignment of a masking policy 530 (e.g., masking policy entity or object) to a table 520 (e.g., table entity or object) based on a tag 510 (e.g., tag entity or object) assigned to the table 520, in accordance with some embodiments of the present disclosure. As shown, based on tag entity mapping 512, the tag 510 is assigned to (e.g., associated with) the table 520. Based on policy entity mapping 532, the masking policy 530 is assigned to (e.g., associated with) the tag 510. Assignments (e.g., mappings) between masking policies and tags can be many-to-many, and assignments (e.g., mappings) between tags and entities (e.g., databases, tables, rows, columns, and the like) can be many-to-many. Based on the assignment of the tag 510 to the table 520, and the assignment of the masking policy 530 to the tag 510, the masking policy 530 is implicitly assigned to the table 520 and any of its components, such as columns (e.g., column entities or objects) of the table 520.

Figure 6:
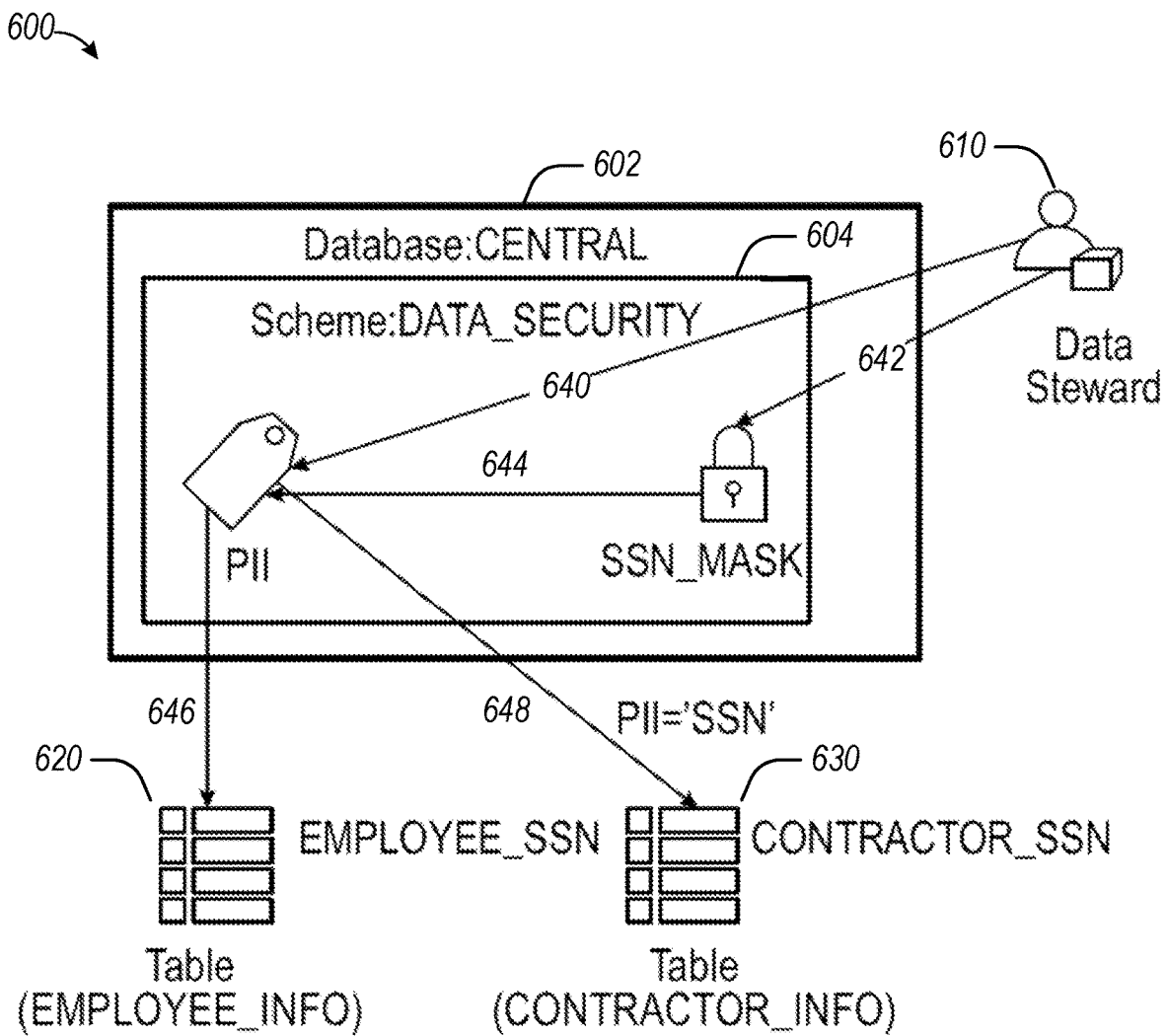
FIG. 6 presents a graphical representation of an example application of a masking policy on tables based on a tag assigned to the tables, in accordance with some embodiments of the present disclosure.

FIG. 6 presents a graphical representation 600 of an example application of a masking policy SSN_MASK on two tables 620 and 630 based on a tag PII assigned to the two tables 620 and 630, in accordance with some embodiments of the present disclosure. As shown, a database 602 (CENTRAL) comprises a scheme 604 (DATA SECURITY), where the scheme 604 defines the tag PII and the masking policy SSN_MASK. A user 610 (DATA STEWARD) causes creation of the tag PII by operation 640, causes creation of the masking policy SSN_MASK by operation 642, and further causes the assignment of the masking policy SSN_MASK to the tag II by operation 644. By operation 646, the user 610 causes the assignment of the tag PII to a column EMPLOYEE_SSN of the table 620 (EMPLOYEE_INFO) using a tag value of 'SSN' (by operation 646) and to a CONTRACTOR_SSN of the table 630 (CONTRACTOR_INFO) using a tag value of 'SSN' (by operation 648). The tag value can be used to indicate that the PII data is social security number data. Based on the assignment of the tag PII, the masking policy SSN_MASK can be mapped to the two columns EMPLOYEE_SSN and CONTRACTOR_SSN, which will cause application (e.g., enforcement) of a mask (of the masking policy SSN_MASK) when a query is performed on either of the columns.

Figure 7:
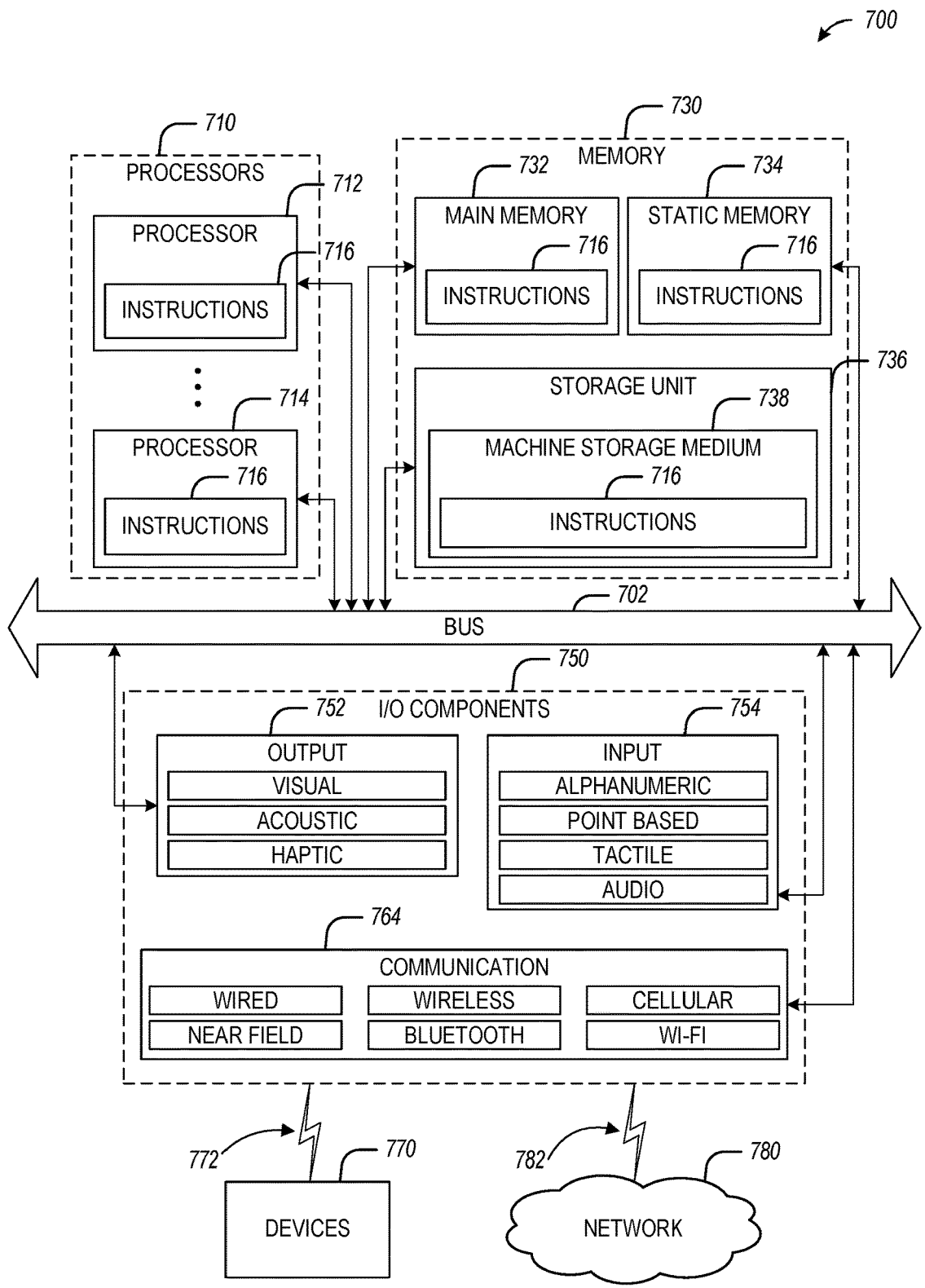
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, instructions 716 may cause machine 700 to execute any one or more operations of method 400 (or any other technique discussed herein, for example in connection with FIG. 4-FIG. 6). As another example, instructions 716 may cause machine 700 to implement one or more portions of the functionalities discussed herein. In this way, instructions 716 may transform a general, non-programmed machine into a particular machine 700 (e.g., the client device 114, the compute service manager 108, or a node in the execution platform 110) that is specially configured to carry out any one of the described and illustrated functions in the manner described herein. In yet another embodiment, instructions 716 may configure the client device 114, the compute service manager 108, and/or a node in the execution platform 110 to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

Machine 700 includes processors 710, memory 730, and input/output (I/O) components 750 configured to communicate with each other such as via a bus 702. In some example embodiments, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, machine 700 may correspond to any one of the client device 114, the compute service manager 108, or the execution platform 110, and the devices 770 may include the client device 114 or any other computing device described herein as being in communication with the network-based database system 102 or the cloud storage platform 104.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of several well-known transfer protocols (e.g., hypertext transfer protocol (HTTP)). Similarly, instructions 716 may be transmitted or received using a transmission medium via the coupling 772 (e.g., a peer-to-peer coupling or another type of wired or wireless network coupling) to the device 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 400 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: accessing a query plan that when executed causes access of stored data from a specified entity of a database system; and during execution of the query plan: determining a set of tags assigned to the specified entity; determining a set of masking policies assigned to at least one tag in the set of tags, and applying at least one masking policy, from the set of masking policies, on the specified entity.

In Example 2, the subject matter of Example 1 includes subject matter where the applying of the at least one masking policy on the specified entity comprises: determining whether a first data type associated with the at least one masking policy matches a second data type associated with the specified entity; and in response to determining that the first data type matches the second data type, applying a mask to at least a portion of the stored data from the specified entity prior to the stored data being accessed for the query plan.

In Example 3, the subject matter of any of Examples 1-2 includes subject matter where the determining of whether the first data type associated with the at least one masking policy matches the second data type associated with the specified entity comprises: obtaining the first data type associated with the at least one masking policy, a definition of the at least one masking policy specifying the first data type.

In Example 4, the subject matter of any of Examples 1-3 includes subject matter where the applying of the mask to at least the portion of the stored data prior to the stored data being accessed for the query plan comprises: applying the mask to at least the portion of the stored data according to a masking definition specified in the at least one masking policy.

In Example 5, the subject matter of any of Examples 1-4 includes subject matter where the masking definition defines a masking function that, when executed on the specified entity, is configured to: access the stored data from the specified entity; generate masked data by applying the mask to at least the portion of the stored data; and return the masked data.

In Example 6, the subject matter of any of Examples 1-5 includes subject matter where the applying of the mask to at least the portion of the stored data prior to the stored data being accessed for the query plan comprises: providing access to the stored data by returning the masking function in place of a reference to the specified entity.

In Example 7, the subject matter of any of Examples 1-6 includes subject matter where the at least one masking policy is a first masking policy, and where the applying of the at least one masking policy on the specified entity comprises: determining whether a second masking policy is directly assigned to the specified entity; and in response to determining that the second masking policy is directly assigned to the specified entity, applying the second masking policy on the specified entity instead of the at least one masking policy.

In Example 8, the subject matter of any of Examples 1-7 includes subject matter where the determining of the set of tags assigned to the specified entity comprises: accessing tag-to-entity mapping data that describes a set of assignments between one or more tags and one or more entities of the database system.

In Example 9, the subject matter of any of Examples 1-8 includes subject matter where the determining of the set of tags assigned to the specified entity comprises: determining any tags directly assigned to the specified entity by way of tag lineage.

In Example 10, the subject matter of any of Examples 1-9 includes subject matter where the specified entity is a first entity, and where the determining of any tags directly assigned to the specified entity by way of tag lineage comprises: determining any tags that are assigned or indirectly assigned to a second entity that is a parent of the specified entity.

In Example 11, the subject matter of any of Examples 1-10 includes subject matter where the second entity is a table object and the specified entity is a column object.

In Example 12, the subject matter of any of Examples 1-11 includes subject matter where the determining of the set of masking policies assigned to the at least one tag in the set of tags comprises: accessing policy-to-entity mapping data that describes a set of assignments between one or more policies and one or more entities of the database system.

In Example 13, the subject matter of any of Examples 1-12 includes subject matter where the specified entity comprises a column object.

In Example 14, the subject matter of any of Examples 1-13 includes subject matter where the operations comprise: prior to accessing the query plan, assigning an individual tag to the specified entity, where the set of tags subsequently determined for the specified entity comprises the individual tag.

In Example 15, the subject matter of any of Examples 1-14 includes subject matter where the operations comprise: prior to accessing the query plan, generating the individual tag.

In Example 16, the subject matter of any of Examples 1-15 includes subject matter where the operations comprise: prior to accessing the query plan, assigning an individual masking policy to the individual tag.

In Example 17, the subject matter of any of Examples 1-16 includes subject matter where the operations comprise: prior to accessing the query plan, generating the individual masking policy, the individual masking policy specifying an association with a specified data type.

Example 18 is a method comprising: accessing, by a processing device, a query plan that when executed causes access of stored data from a specified entity of a database system; and during execution of the query plan: determining, by the processing device, a set of tags assigned to the specified entity; determining, by the processing device, a set of masking policies assigned to at least one tag in the set of tags, and applying, by the processing device, at least one masking policy, from the set of masking policies, on the specified entity.

In Example 19, the subject matter of Example 18 includes subject matter where the applying of the at least one masking policy on the specified entity comprises: determining whether a first data type associated with the at least one masking policy matches a second data type associated with the specified entity; and in response to determining that the first data type matches the second data type, applying a mask to at least a portion of the stored data from the specified entity prior to the stored data being accessed for the query plan.

In Example 20, the subject matter of any of Examples 18-19 includes subject matter where the determining of whether the first data type associated with the at least one masking policy matches the second data type associated with the specified entity comprises: obtaining the first data type associated with the at least one masking policy, a definition of the at least one masking policy specifying the first data type.

In Example 21, the subject matter of any of Examples 18-20 includes subject matter where the applying of the mask to at least the portion of the stored data prior to the stored data being accessed for the query plan comprises: applying the mask to at least the portion of the stored data according to a masking definition specified in the at least one masking policy.

In Example 22, the subject matter of any of Examples 18-21 includes subject matter where the masking definition defines a masking function that, when executed on the specified entity, is configured to: access the stored data from the specified entity; generate masked data by applying the mask to at least the portion of the stored data; and return the masked data.

In Example 23, the subject matter of any of Examples 18-22 includes subject matter where the applying of the mask to at least the portion of the stored data prior to the stored data being accessed for the query plan comprises: providing access to the stored data by returning the masking function in place of a reference to the specified entity.

In Example 24, the subject matter of any of Examples 18-23 includes subject matter where the at least one masking policy is a first masking policy, and where the applying of the at least one masking policy on the specified entity comprises: determining whether a second masking policy is directly assigned to the specified entity; and in response to determining that the second masking policy is directly assigned to the specified entity, applying the second masking policy on the specified entity instead of the at least one masking policy.

In Example 25, the subject matter of any of Examples 18-24 includes subject matter where the determining of the set of tags assigned to the specified entity comprises: accessing tag-to-entity mapping data that describes a set of assignments between one or more tags and one or more entities of the database system.

In Example 26, the subject matter of any of Examples 18-25 includes subject matter where the determining of the set of tags assigned to the specified entity comprises: determining any tags directly assigned to specified entity by way of tag lineage.

In Example 27, the subject matter of any of Examples 18-26 includes subject matter where the specified entity is a first entity, and where the determining of any tags directly assigned to the specified entity by way of tag lineage comprises: determining any tags that are assigned or indirectly assigned to a second entity that is a parent of the specified entity.

In Example 28, the subject matter of any of Examples 18-27 includes subject matter where the second entity is a table object and the specified entity is a column object.

In Example 29, the subject matter of any of Examples 18-28 includes subject matter where the determining of the set of masking policies assigned to the at least one tag in the set of tags comprises: accessing policy-to-entity mapping data that describes a set of assignments between one or more policies and one or more entities of the database system.

Example 30 is a computer-readable medium comprising instructions that, when executed by one or more processors of a machine, configure the machine to perform operations comprising: accessing a query plan that when executed causes access of stored data from a specified entity of a database system; and during execution of the query plan: determining a set of tags assigned to the specified entity; determining a set of masking policies assigned to at least one tag in the set of tags, and applying at least one masking policy, from the set of masking policies, on the specified entity.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
      accessing a query plan that when executed causes access of stored data from a specified entity of a database system, the query plan being generated based on a query expression that references the specified entity, and the specified entity being a schema-level entity; and
      during execution of the query plan:
         determining a set of tags assigned to the specified entity;
         determining a set of masking policies assigned to at least one tag in the set of tags, and
         applying at least one masking policy, from the set of masking policies, on the specified entity by applying a mask to at least a portion of the stored data from the specified entity prior to the stored data being accessed for the query plan, the mask being applied to at least the portion of the stored data according to a masking definition specified in the at least one masking policy assigned to the at least one tag, the masking definition defining a masking function, the applying of the mask to at least the portion of the stored data comprises providing access to the stored data by returning the masking function in place of a reference to the specified entity.

2. The system of claim 1, wherein the applying of the mask to at least the portion of the stored data prior to the stored data being accessed for the query plan comprises:
   determining whether a first data type associated with the at least one masking policy matches a second data type associated with the specified entity; and
   in response to determining that the first data type matches the second data type, applying the mask to at least the portion of the stored data from the specified entity prior to the stored data being accessed for the query plan.

3. The system of claim 2, wherein the determining of whether the first data type associated with the at least one masking policy matches the second data type associated with the specified entity comprises:
   obtaining the first data type associated with the at least one masking policy, a definition of the at least one masking policy specifying the first data type.

4. The system of claim 2, wherein the masking definition defines a masking function that, when executed on the specified entity, is configured to:
   access the stored data from the specified entity;
   generate masked data by applying the mask to at least the portion of the stored data; and
   return the masked data.

5. The system of claim 1, wherein the at least one masking policy is a first masking policy, and wherein the applying of the at least one masking policy on the specified entity comprises:
   determining whether a second masking policy is directly assigned to the specified entity; and
   in response to determining that the second masking policy is directly assigned to the specified entity, applying the second masking policy on the specified entity instead of the at least one masking policy.

6. The system of claim 1, wherein the determining of the set of tags assigned to the specified entity comprises:
   accessing tag-to-entity mapping data that describes a set of assignments between one or more tags and one or more entities of the database system.

7. The system of claim 1, wherein the determining of the set of tags assigned to the specified entity comprises:
   determining any tags directly assigned to the specified entity by way of tag lineage.

8. The system of claim 7, wherein the specified entity is a first entity, and wherein the determining of any tags directly assigned to the specified entity by way of tag lineage comprises:
   determining any tags that are assigned or indirectly assigned to a second entity that is a parent of the specified entity.

9. The system of claim 8, wherein the second entity is a table object and the specified entity is a column object.

10. The system of claim 1, wherein the determining of the set of masking policies assigned to the at least one tag in the set of tags comprises:
    accessing policy-to-entity mapping data that describes a set of assignments between one or more policies and one or more entities of the database system.

11. The system of claim 1, wherein the specified entity comprises a column object.

12. The system of claim 1, wherein the operations comprise:
    prior to accessing the query plan, assigning an individual tag to the specified entity, wherein the set of tags subsequently determined for the specified entity includes the individual tag.

13. The system of claim 12, wherein the operations comprise:
  prior to accessing the query plan, generating the individual tag.

14. The system of claim 12, wherein the operations comprise:
  prior to accessing the query plan, assigning an individual masking policy to the individual tag.

15. The system of claim 14, wherein the operations comprise:
  prior to accessing the query plan, generating the individual masking policy, the individual masking policy specifying an association with a specified data type.

16. A method comprising:
  accessing, by a processing device, a query plan that when executed causes access of stored data from a specified entity of a database system, the query plan being generated based on a query expression that references the specified entity, and the specified entity being a schema-level entity; and
  during execution of the query plan:
    determining, by the processing device, a set of tags assigned to the specified entity;
    determining, by the processing device, a set of masking policies assigned to at least one tag in the set of tags, and
    applying, by the processing device, at least one masking policy, from the set of masking policies, on the specified entity by applying a mask to at least a portion of the stored data from the specified entity prior to the stored data being accessed for the query plan, the mask being applied to at least the portion of the stored data according to a masking definition specified in the at least one masking policy assigned to the at least one tag, the masking definition defining a masking function, the applying the mask to at least the portion of the stored data comprises providing access to the stored data by returning the masking function in place of a reference to the specified entity.

17. The method of claim 16, wherein the applying of the mask to at least the portion of the stored data prior to the stored data being accessed for the query plan comprises:
  determining whether a first data type associated with the at least one masking policy matches a second data type associated with the specified entity; and
  in response to determining that the first data type matches the second data type, applying the mask to at least the portion of the stored data from the specified entity prior to the stored data being accessed for the query plan.

18. The method of claim 17, wherein the determining of whether the first data type associated with the at least one masking policy matches the second data type associated with the specified entity comprises:
  obtaining the first data type associated with the at least one masking policy, a definition of the at least one masking policy specifying the first data type.

19. The method of claim 17, wherein the masking definition defines a masking function that, when executed on the specified entity, is configured to:
  access the stored data from the specified entity;
  generate masked data by applying the mask to at least the portion of the stored data; and
  return the masked data.

20. The method of claim 16, wherein the at least one masking policy is a first masking policy, and wherein the applying of the at least one masking policy on the specified entity comprises:
  determining whether a second masking policy is directly assigned to the specified entity; and
  in response to determining that the second masking policy is directly assigned to the specified entity, applying the second masking policy on the specified entity instead of the at least one masking policy.

21. The method of claim 16, wherein the determining of the set of tags assigned to the specified entity comprises:
  accessing tag-to-entity mapping data that describes a set of assignments between one or more tags and one or more entities of the database system.

22. The method of claim 16, wherein the determining of the set of tags assigned to the specified entity comprises:
  determining any tags directly assigned to specified entity by way of tag lineage.

23. The method of claim 22, wherein the specified entity is a first entity, and wherein the determining of any tags directly assigned to the specified entity by way of tag lineage comprises:
  determining any tags that are assigned or indirectly assigned to a second entity that is a parent of the specified entity.

24. The method of claim 23, wherein the second entity is a table object and the specified entity is a column object.

25. The method of claim 16, wherein the determining of the set of masking policies assigned to the at least one tag in the set of tags comprises:
  accessing policy-to-entity mapping data that describes a set of assignments between one or more policies and one or more entities of the database system.

26. A non-transitory computer-readable medium comprising instructions that, when executed by one or more processors of a machine, configure the machine to perform operations comprising:
  accessing a query plan that when executed causes access of stored data from a specified entity of a database system, the query plan being generated based on a query expression that references the specified entity, and the specified entity being a schema-level entity; and
  during execution of the query plan:
    determining a set of tags assigned to the specified entity;
    determining a set of masking policies assigned to at least one tag in the set of tags, and
    applying at least one masking policy, from the set of masking policies, on the specified entity by applying a mask to at least a portion of the stored data from the specified entity prior to the stored data being accessed for the query plan, the mask being applied to at least the portion of the stored data according to a masking definition specified in the at least one masking policy assigned to the at least one tag, the masking definition defining a masking function, the applying the mask to at least the portion of the stored data comprises providing access to the stored data by returning the masking function in place of a reference to the specified entity.

27. The non-transitory computer-readable medium of claim 26, wherein the applying of the mask to at least the portion of the stored data prior to the stored data being accessed for the query plan comprises:
- determining whether a first data type associated with the at least one masking policy matches a second data type associated with the specified entity; and
- in response to determining that the first data type matches the second data type, applying the mask to at least the portion of the stored data from the specified entity prior to the stored data being accessed for the query plan.

28. The non-transitory computer-readable medium of claim 27, wherein the determining of whether the first data type associated with the at least one masking policy matches the second data type associated with the specified entity comprises:
- obtaining the first data type associated with the at least one masking policy, a definition of the at least one masking policy specifying the first data type.

29. The non-transitory computer-readable medium of claim 27, wherein the masking definition defines a masking function that, when executed on the specified entity, is configured to:
- access the stored data from the specified entity;
- generate masked data by applying the mask to at least the portion of the stored data; and
- return the masked data.

30. The non-transitory computer-readable medium of claim 26, wherein the at least one masking policy is a first masking policy, and wherein the applying of the at least one masking policy on the specified entity comprises:
- determining whether a second masking policy is directly assigned to the specified entity; and
- in response to determining that the second masking policy is directly assigned to the specified entity, applying the second masking policy on the specified entity instead of the at least one masking policy.

* * * * *